US 9,405,786 B2

(12) United States Patent
Malin et al.

(10) Patent No.: US 9,405,786 B2
(45) Date of Patent: Aug. 2, 2016

(54) SYSTEM AND METHOD FOR DATABASE FLOW MANAGEMENT

(71) Applicant: NICE-SYSTEMS LTD., Ra'anana (IL)

(72) Inventors: Anat Malin, Petach Tikva (IL); Eran Moshe Talbi, Kfar Saba (IL); Vadim Ilyasov, Tel-Aviv (IL); Matan Keret, Oulu (FI); Roni Krivoshey, Ramat Hasharon (IL); Yoav Bahat, Givatayim (IL); Efim Kolodizner, Ashdod (IL); Tal Zur, Rishon-Lezion (IL)

(73) Assignee: NICE-SYSTEMS LTD., Ra'Anana (IL)

( * ) Notice: Subject to any disclaimer, the term of this patent is extended or adjusted under 35 U.S.C. 154(b) by 79 days.

(21) Appl. No.: 14/059,576

(22) Filed: Oct. 22, 2013

(65) Prior Publication Data

US 2015/0112947 A1 Apr. 23, 2015

(51) Int. Cl.
*G06F 17/30* (2006.01)
(52) U.S. Cl.
CPC ................ *G06F 17/30348* (2013.01)
(58) Field of Classification Search
USPC .............. 707/610, 640, 661, 674, 694, 736
See application file for complete search history.

(56) References Cited

U.S. PATENT DOCUMENTS

2012/0179677 A1* 7/2012 Roselli ................... G06Q 10/10
707/736

* cited by examiner

*Primary Examiner* — Sana Al Hashemi
(74) *Attorney, Agent, or Firm* — Pearl Cohen Zedek Latzer Baratz LLP (57) ABSTRACT

A system and method for database flow management may include a rule engine which may examine information related to an interaction; select an action queue from the plurality of action queues; and store, in the selected action queue, archiving information related to the interaction. A recorder may select an action queue from the plurality of action queues; extract archiving information from the selected action queue and perform an archiving operation based on the extracted archiving information. The recorder may update an archiving information queue according to a result of the archiving operation. A unit may examine the plurality of archiving information queues to identify completed archiving operations and update a global table to include completed archiving operations. Other embodiments are described and claimed.

18 Claims, 7 Drawing Sheets

SYSTEM AND METHOD FOR DATABASE FLOW MANAGEMENT

BACKGROUND OF THE INVENTION

Recording and archiving of data are widely used in various fields. For example, interactions with contact centers are often recorded and recorded interactions are archived. Typically, recorders perform both the actual recording of an interaction and the archiving of recorded calls. Accordingly, a large number of recorders acting as archiving servers may compete for a limited number of resources. For example, a large number of archiving servers may all need to update the same tables in a database. Moreover, tables in a database that need to be updated by archiving servers may also be accessed by clients. Accordingly, current solutions suffer from bottlenecks that degrade performance and prevent scalability.

SUMMARY OF EMBODIMENTS OF THE INVENTION

A system may include a plurality of action queues and a plurality of archiving information queues. A rule engine may be configured to examine information related to an interaction; select an action queue from the plurality of action queues, and store, in the selected action queue, archiving information related to the interaction. A plurality of recorders may be configured to select an action queue from the plurality of action queues; extract archiving information from the selected action queue; perform an archiving operation based on the extracted archiving information, and update an archiving information queue according to a result of the archiving operation. In one embodiment, an archiving operation includes storing or archiving a recording of an interaction. Other operations may be included in an archiving operation. For example, encrypting a recording prior to storing it may be part of an archiving operation. A unit may be configured to examine the plurality of archiving information queues to identify completed archiving operations, and update a global table to include completed archiving operations.

Figure 3:
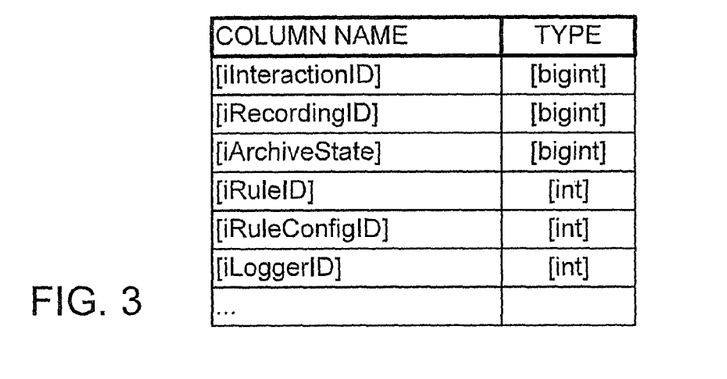
FIG. 3 shows a structure according to some embodiments of the present invention.

Updating a global table may include storing, in the global table, a reference to a recording of the interaction. A recorder may be configured to select an action queue based on an identification parameter associated with the recorder. A rule engine may be configured to select an action queue for an interaction based on an identification of a recorder that recorded the interaction. A recorder may be configured to update an archiving information queue to indicate successful completion of an archiving operation. For example, to update an archiving information queue, a recorder may store, in the archiving information queue, a data structure as shown in FIG. 3 and further discussed herein. A data structure stored in an archiving information queue may include fields or entries that indicate or identify the relevant interaction, the recorder or logger that recorded the interaction, a state (e.g., in progress, successfully completed, failed) and the like. Any relevant information may be included in a data structure stored, by a recorder, in an archiving information queue. Updating an archiving information queue is further discussed below.

A system or method may include selecting, from a plurality of action queues, an action queue and storing, in the selected action queue, archiving information related to an interaction; moving the archiving information, by a recorder associated with the action queue, to an archiving information queue and performing, by the recorder, an archive operation related to the interaction. A system or method may include updating archiving a plurality of information queues to indicate completion of the archive operations; and collecting archiving information from a plurality of archiving information queues and updating a global table based on the collected archiving information.

A system or method may include collecting archiving information from a plurality of archiving information queues may include verifying completion of related archive operations. Updating a global table may comprise including, in the global table, a reference to a recording of an interaction. Selecting an action queues may be based on an identification of a recorder that recorded the interaction.

A system or method may include examining information related to a recording of an interaction and determining an identification of a recorder that recorded the interaction; selecting, based on the identification, an action queue for storing archiving information related to an interaction; moving the archiving information, by the recorder, to an archiving information queue and performing, by the recorder, an archive operation related to the interaction; updating, by the recorder, the archiving information queue to indicate a progress of the archive operation, and updating a global table based on archiving information obtained from a plurality of archiving information queues.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further,

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

An interaction as referred to herein may be an interaction of a user or customer with a person or entity (e.g. an automated entity such as an avatar or a bot) at an organization such as a contact center. For example, an interaction may be a telephone call involving a customer and a human or an automated agent in a contact or call center. In another embodiment, an interaction may be a web session. For example, using a web browser, a customer may interact with a contact center by interacting with an application on a web site maintained by the contact center. For the sake of simplicity, telephone calls are mainly discussed herein, however, it will be understood that other interactions may be applicable.

A system and method according to embodiments of the invention may record interactions or record data related to interactions. For example, a telephone call or a web session may be recorded, or data related to these interactions, such as audio data, metadata, and/or text records may be recorded. A recording of an interaction may include (or be associated with) metadata related to the interaction. For example, metadata of a recording of an interaction may include a timestamp indicating a start and end time of the interaction, telephone numbers of the calling and called parties, an identification of a recorder that records the interaction and the like.

Archiving an interaction generally includes storing (e.g., in a database and/or in a storage system) a recording of the interaction or data relating or part of the interaction and, possibly, storing metadata related to the interaction. For example, archiving an interaction includes storing, on a hard drive or disk, a file containing a recording of the interaction. An archiving request may be a request to store a recording of an interaction and/or store metadata related to the interaction. In an embodiment, an archiving request is a request to archive a recording (and possibly metadata) of an interaction.

Queues (e.g., archiving actions queues 225 and archiving info queues 240 further described herein) may be any suitable entity adapted to store data structures and provide stored data structures. For example, a queue may be a computing device operatively connected to a storage system and configured to receive requests and data for storage and store data in the storage system. A queue may further be a computing device operatively connected to a storage system configured to receive requests for stored data and provide the requested data. Accordingly, it will be understood that any system or method may be used in order to implement queues as described herein without departing from the scope of the invention. For example, a database or memory may be used as a queue where the database is configured to perform operations of a queue as described herein.

In one embodiment, a rule engine causes recorders to archive recorded interactions by placing archiving actions in archiving action queues. Generally, archiving a recorded interaction may include storing the recorded interaction in a database, or moving the recorded interaction from a temporary or local storage to a more permanent storage. For example, a recorder may record an interaction by storing a recording of a telephone call in a storage device that is internal to the recorder. To archive a recording of the interaction, the recorder may move the recorded interaction from its internal storage to a database. For example, archiving a recorded interaction may be storing the recoded interaction in a device or system that is suitable for long term storage. A recorder as referred to herein may be any unit adapted to record an interaction. A recorder as referred to herein may be a recorder or logger as known in the art, e.g., a recorder or logger used to record interactions in a contact center. An archiving action may be a request or command to archive a recording of an interaction. For example, an archiving action includes a reference to the recording of the interaction. In an embodiment, a rule engine causes a specific recorder to archive an interaction by placing an archive action for the interaction in a queue which is associated with the specific recorder. Accordingly, a rule engine may distribute archiving of recorded interactions over a large number of recorders. In an embodiment, a rule engine selects the recorder that recorded the interaction as the recorder that will also archive the interaction.

Queues described herein, e.g., archiving actions queues 225 and archiving info queues 240, may be any suitable queues or units usable for storing data and retrieving stored data. For example, in an embodiment, archiving actions queues 225 and archiving info queues 240 are designed and implemented as Structured Query Language (SQL) queues as known in the art. In other embodiments, archiving actions queues 225 and archiving info queues 240 may be first in first out (FIFO) queues, e.g., such that jobs stored in a queue are executed according to the order they entered the queue. In yet other embodiments, queues may be last in first out (LIFO) queues, e.g., such that the last archiving action placed in a queue is the next or first one to be executed. Other queues may be used. It will be understood that the scope of the invention is not limited by the type of queues used. Data structures other than queues may be used, for example, any data structure or memory enabling a first entity (e.g., RE 215) to store data and enabling a second entity (e.g., a recorder 230) to retrieve the stored data may be used.

In one embodiment, recorders check archiving action queues, extract archiving actions therefrom and, based on information in the archiving actions, archive recorded interactions in a storage system. For example, if archiving action queues are FIFO queues then archiving actions are extracted according to the order they were inserted into archiving actions queues.

In an embodiment, recorders update archiving info queues. For example, recorders update archiving info queues to indicate that an archiving of a recording of an interaction was completed successfully. In an embodiment, a DB (database) job unit or module checks archiving info queues and, when the DB job determines (e.g., based on information in archiving info queues) that an archiving of a recording of an interaction was completed successfully, the DB job updates a complete archiving table. A complete archiving table may be any suitable structure that stores information related to archived recordings of interactions. In an embodiment, DB job 245 updates a complete archiving table to include a reference to a recorded interaction that was successfully archived and further removes a reference from an archiving info queue.

A Client of a system may be any suitable entity. For example, a person, application or device may access complete archiving table, e.g., in order to retrieve an archived recorded interaction. For example, a software module may be provided to enable an agent (a human or an automated agent) in a contact center to interact with complete archiving table 250. Clients of a system can use the complete archiving table in order to retrieve or otherwise use recorded interaction. For example, if a client needs a recording of a specific interaction, the client can determine whether or not the recording is archived in a storage system based on information in the complete archiving table. Generally, an archiving action may be a data structure as for example shown in FIG. 3 and described in related text. In one embodiment, data structures similar to the one shown in FIG. 3 are stored in archiving action queues and in archiving info queues as described further herein. Data structures other than those shown in FIG. 3 may be used.

Figure 1:
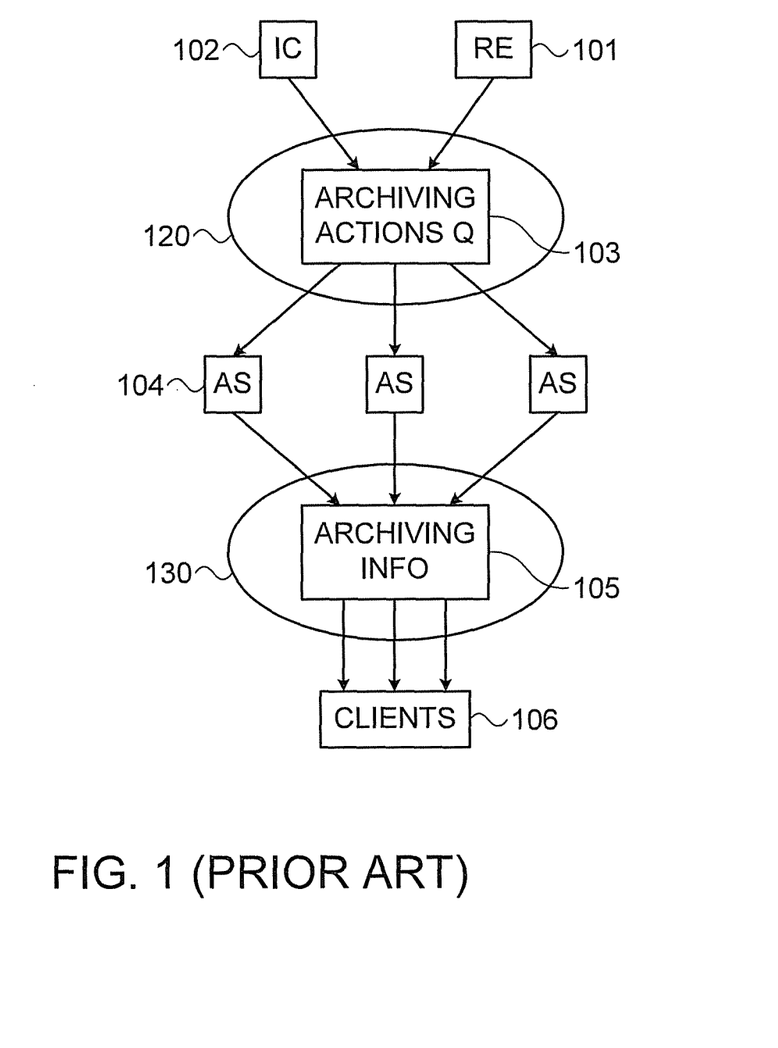
FIG. 1 is a high level block diagram of a prior art system.

Reference is now made to FIG. 1 which shows a high-level block diagram of a prior art system. As shown, an archiving queue 103 is used to receive and store requests for archiving interactions. An interaction center (IC) 102 and a rule engine (RE) 101 may store archiving requests in archiving actions queue 103.

A number of archiving servers (AS) 104 are used to read from the archiving actions queue 103. As shown, archiving servers 104 all need to write to the archiving info queue 105 which is used by clients 106 in order to access archived data. Accordingly, a very large number of concurrent updates, deletes and queries from multiple writers and readers of the same tables in a database and same queues cause bottlenecks as shown by circles 120 and 130 thus limiting performance, capacity and/or scalability of a system.

Embodiments of the invention may enable a very large number of concurrent updates, deletes and queries from multiple writers and readers of a database.

Figure 2:
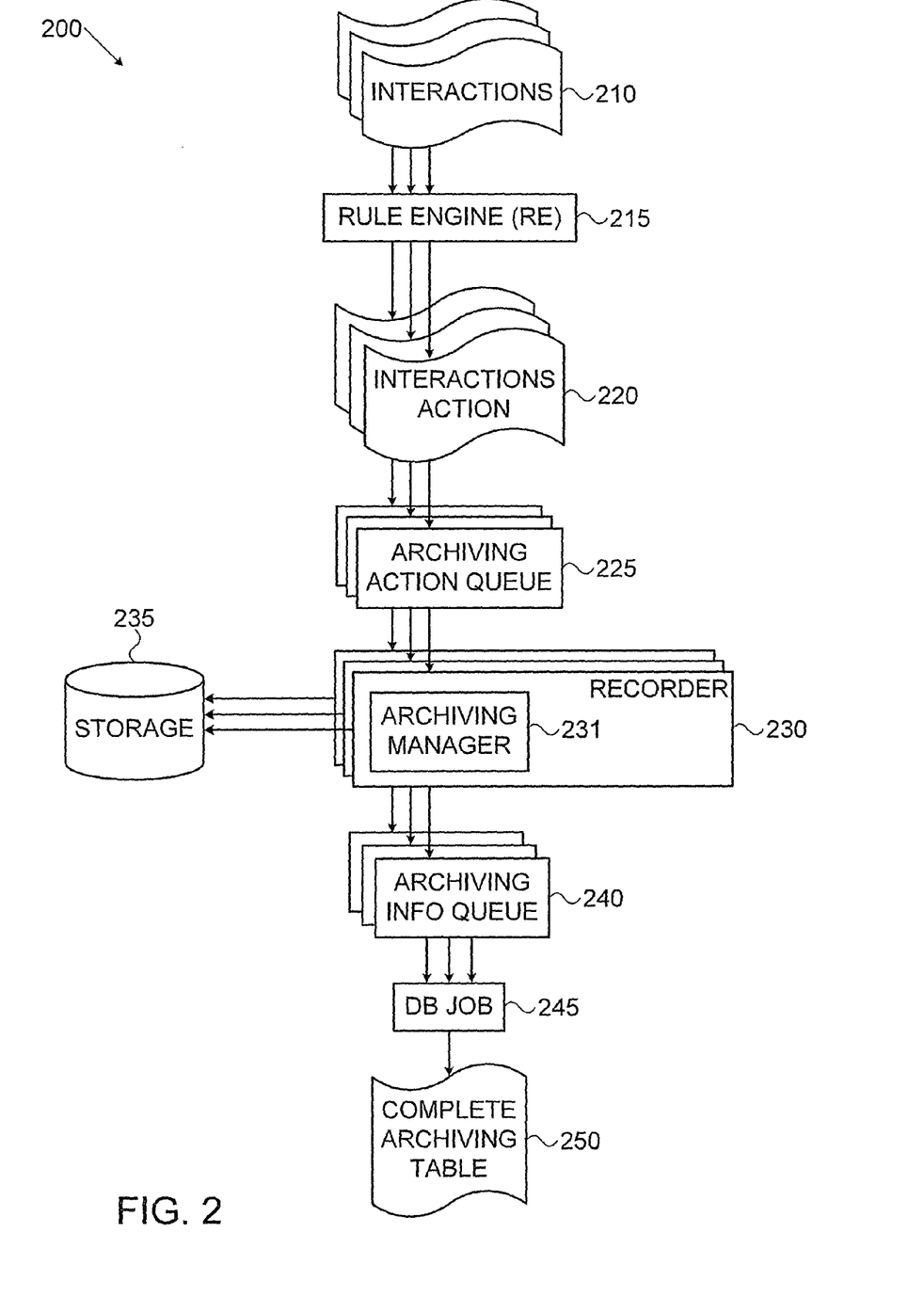
FIG. 2 shows a system according to some embodiments of the present invention.

Reference is now made to FIG. 2 which shows a high-level block diagram of a system 200 according to embodiments of the invention. As shown, a system may include a rule engine (RE) 215. As shown by blocks 210, information related to interactions may be provided as input to RE 215. For example, interactions data 210 provided as shown may be any data related to an interaction. For example, an element in interactions data 210 may include an identification parameter or value that identifies the recorder that recorded the interaction, a time the interaction took place, a time length, a size of a file containing a recording of the interaction, a reference to the file containing the of the interaction and the like. Other or different data may be included. Interactions data 210 may be provided by a management system in a contact center or by any other module or unit that tracks or monitors interactions in a contact center. For example, rule engine 215 obtains or receives interactions data 210 from an external module in a contact center (not shown).

For example, when a recorder 230 records an interaction it updates a table or list of interactions and RE 215 may access such list in order to retrieve interactions for processing. In an embodiment, RE 215 is a device 1100 as described herein or RE 215 is included device 1100. Accordingly, RE 215 may receive interactions 210 over a computer network or otherwise as known in the art.

As shown by blocks 220, RE 215 may generate an archiving action for interactions 210. In one embodiment, an archiving action is a command or request to archive a recording of an interaction. In an embodiment, information in an archiving action is used in order to archive the interaction. Reference is additionally made to FIG. 3 that shows an exemplary structure that may be, or may be used in order to represent, an archiving action, according to embodiments of the invention. Other structures, and other interaction data, may be used. As further described herein, the structure shown by FIG. 3 may be, or be used in order to represent, an archiving info element and/or a completed archiving element. As shown in FIG. 3, an archiving action element may include an interaction identification (ID) possibly assigned by a management unit, a recorder ID identifying the recorder or logger that recorded the interaction ID (e.g., as shown by "iLoggerID"), an archive state indicating the state of archiving (e.g., in progress, failed or completed), a rule ID, a rule configuration ID. Generally, a rule may dictate which interactions are archived or how interactions are archived. For example, a rule may indicate which interaction recordings are to be archived or a rule may indicate which interaction recordings are not to be archived. A rule may define criteria (e.g., length of interaction, agent, time of day and the like) and a system (e.g., a rule engine) may only select for archiving interaction recordings that match the criteria.

In one embodiment, a Rule ID is a number that represents a certain rule; Rule IDs other than numbers may be used. In an embodiment, a Rule configuration ID is a number that represents a change to a rule; Rule configuration IDs other than numbers may be used. For example a new rule was created an received Rule ID 1 configuration id 1, when the rule is changed (for example retention) the changed rule will have Rule ID 1 and a Rule configuration ID 2. Any other data may be included in an archiving action generated by RE 215. Accordingly, as referred to herein, an archiving action may be any object or structure that includes data related to an interaction.

As shown by blocks 225, system 200 may include archiving action queues. Archiving action queues 225 may be any suitable modules enabling units, processes or modules to store and retrieve messages or objects. A queue (e.g., archiving actions queue 225 and/or archiving info queue 240) as referred to herein may store a plurality of objects and may further enable searching for stored objects and/or retrieval of stored objects, e.g., based on an identification or field in a stored object. It will be understood that embodiments of the invention are not limited by the type of queues used. Any queues (e.g., software message queues as known in the art) may be used. A queue as referred to herein may be included in a database, accordingly, storing information in a queue or retrieving information from a queue may include storing information in a database or retrieving information from a database. While a queue is referred to herein, different embodiments may use data structures other than queues. A plurality of other structures, modules or units may be used such that each recorder in a plurality of recorders can log (e.g., record) progress or completion of archiving jobs separately, in a unit or structure associated with the recorder, and a central unit (e.g., DB job 245) can collect information from the plurality structures, modules or units and update a central or global structure (e.g., complete archiving table 250).

As shown by blocks 230, system 200 may include a plurality of recorders. In one embodiment, a recorder 230 records an interaction (or data from an interaction) and may further archive the recorded interaction or data. Accordingly, in an embodiment, a recorder is also used as an archiving server that archives interactions or interaction data which were recorded by the recorder. For example, a recorder included in recorders 230 may archive an interaction by archiving or storing a recording of the interaction on storage 235.

Storage 235 may be a hard disk drive, an array of hard disks, a Compact Disk (CD) drive and media, a CD-Recordable (CD-R) drive and media, or any other suitable removable and/or fixed storage unit or system. Storage 235 may include a USB storage device or a network storage device and may further include any management module or unit, e.g., a unit enabling searching for archived interactions and the like.

As shown, a recorder 230 may include an archiving manager 231. In an embodiment, archiving manager 231 extracts or selects archiving actions 220 from archiving action queues 225. In one embodiment, a specific recorder in recorders 230 is associated with a specific archiving action queue as described. Accordingly, archiving manager 231 may simply extract the next archiving action from the associated archiving action queue. In an embodiment, archiving manager 231 updates archiving info queues 240. For example, archiving manager 231 adds an entry to the info queue. For example, an entry added (or modified) by archiving manager 231 indicates an archiving of a recording of an interaction is in progress, was completed successfully or failed. Operations and other aspects of archiving manager 231 are further described herein. In an embodiment, archiving manager 231 is a device 1100 as described herein or archiving manager 231 is included in device 1100. Accordingly, archiving manager 231 may extract or select archiving actions 220 from archiving action queues 225 and store archiving information in archiving info queues 240 using methods well known in the art.

As shown by blocks 240, system 200 may include archiving info queues. Archiving info queues 240 may be any suitable modules enabling units, processes or modules to store and retrieve messages or objects. For example, archiving info queues may be similar to archiving action queues in design or implementation. Archiving managers included in recorders 230 may each update an associated archiving info queue in archiving info queues 240. In an embodiment, archiving managers 231 update associated archiving info queues to reflect or indicate that an archive of an interaction is in progress or is completed or that an archiving operation has failed. In an embodiment, objects stored by archiving managers 231 in archiving queues 240 are as shown by FIG. 3.

In an embodiment, the same or similar structure used to store elements such as archiving actions in archiving action queues 225 may be used to store elements such as archiving info in archiving info queues 240. Moreover, in an embodiment, the same or similar structure used to store elements in archiving action queues 225 as described with reference to FIG. 3 may be used in order to store elements in complete archiving table or database 250. Complete archiving table or database 250 may be any suitable structure or unit. For example, complete archiving table or database 250 may be a memory segment in a memory of a computing device (e.g., a portion of memory 1120 in computing device 1100). In another embodiment, complete archiving table or database 250 may be an entity similar to archiving action queues 225. For example, complete archiving table or database 250 may be a unit that includes a controller and memory adapted to receive data from DB job 245, store received data and provide stored data to clients of system 200. It will be understood that any other data, parameters, entries or fields may be added to data stored in queues 225, 240 and table 250. A structure used to represent interactions 210 may be similar to the structure shown in FIG. 3. For example, an interaction 210 may include an identification of the recorder or logger that recorded or logged the interaction (e.g., as shown by "iLoggerID") and identification of the interaction (e.g., as shown by "iInteractionID"). In an embodiment, to generate an archiving action 220, RE 215 uses data in interactions 210, complete archiving table.

As shown, a system may include a database (DB) job 245. DB job 245 may be any suitable unit or module adapted to extract or select data or information from archiving info queues 240 and update, based on data retrieved from archiving info queues 240, data in complete archiving table 250. For example, based on information in one of archiving info queues 240, DB job 245 determines whether or not archiving of an interaction is completed. If, based on information in an archiving info queue, DB job 245 determines archiving of an interaction is completed, DB job 245 may update complete archiving table 250 to reflect that the archiving of the interaction is competed. If, based on information in an archiving info queue, DB job 245 determines archiving of an interaction is not yet completed or failed, DB job 245 may generate an alert or it may check the archiving info queue again at a later stage.

In an embodiment, DB job 245 includes a reference to a recording of the interaction. For example, DB job 245 inserts into complete archiving table 250 any data needed in order to obtain a recording of an interaction. Accordingly, clients may use data in complete archiving table 250 in order to obtain recorded interactions. For example, DB job 245 inserts into complete archiving table 250 a reference to a recording of the interaction, e.g., a file name or other reference that enables a client to find the recording of the interaction. Accordingly, to obtain a recording of an interaction, a client may check complete archiving table 250 in order to verify or determine the recording is indeed archived (by verifying a successful archiving of the recording is indicated in complete archiving table 250). A client may further obtain, from complete archiving table 250, a reference or pointer to the recording and use the reference or pointer in order to obtain the recording, e.g., from storage 235.

Accordingly, clients of system 200 can use complete archiving table 250 in order to retrieve archived interactions.

In an embodiment, DB job 245 is a device 1100 as described herein or DB job 245 is included in, or executed by, device 1100.

Complete archiving table 250 may be a table, list or any other suitable structure or object configured to store information related to archived interactions as further described herein. In an embodiment, complete archiving table 250 may be a queue similar to other queues described herein, e.g., archiving action queues 225. For example, by DB job 245 may update complete archiving table 250 to include any information, data or parameters that may be needed in order to retrieve a recorded and/or archived interaction. For example, complete archiving table 250 may include a pointer or other reference to a file in storage 235 that contains the recorded interaction. Any other data or metadata may be stored in complete archiving table 250, e.g., a timestamp, a length of a recording, a name of an agent who participated in the interaction and the like.

Accordingly, in one embodiment, a system may include a plurality of action queues (e.g., archiving actions queues 225) and a plurality of archiving information (info) queues (e.g., archiving info queues 240). In an embodiment, the system includes a rule engine (e.g., RE 215) configured to examine or analyze information related to an interaction (e.g., an interaction 210), select or choose an action queue from the plurality of action queues (e.g., select one archiving action queue from archiving action queues 225), and add to or store, in the selected archiving action queue, archiving information related to the interaction. For example, archiving information may be as shown in FIG. 3 and described in related text. Other archiving information may be stored.

In one embodiment, a system includes a plurality of recorders (e.g., recorder 230), each configured to select or choose an action queue from the plurality of action queues (e.g., as done by archiving manager 231 in a recorder), extract archiving information from the selected action queue, perform an archiving operation based on the extracted archiving information, and update an archiving information queue according to a result of the archiving operation (e.g., update archiving info queues 240 as described). For example, extracted archiving information may include an identification of an interaction to be archived, e.g., as shown in FIG. 3 and described herein. Extracted archiving information may include any other relevant information that may be required for, or used in, archiving a recording of an interaction, e.g., where to store a recording of the interaction (e.g., a specific partition in a database and the like). Such information may guide how and where to update a queue.

In an embodiment, a system includes a unit (e.g., DB job 245) configured to examine or analyze the plurality of archiving information queues (e.g., archiving info queues 240) to identify or find completed archiving operations, and update a global table (e.g., complete archiving table 250) to include completed archiving operations.

System 200 may enable a number of methods for archiving recorded interactions (or archiving interactions for short). For example, a method may include associating a plurality of archiving action queues (e.g., archiving action queues 225) and a plurality of archiving information queues (e.g., archiving information queues 240) with a respective plurality of recorders (e.g., recorders 230). For example, to associate a recorder with an archiving action queue and an archiving information queue, an identification number or parameter may be associated with the recorder and queues. For example, the recorders and queues may be assigned numbers and a recorder such as recorder number three ("3") is associated with archiving information queue number three and with archiving action queue number three. For example, in order to obtain archiving action requests, recorder number three may only extract jobs (archiving action requests) from archiving action queue number 3. Likewise, in order to cause recorder number three to archive a recording of an interaction, RE 215 may store archiving action requests in archiving action queue number three.

For example, RE 215 examines an interaction data 210 and determines that recorder number five ("5") is the recorder that recorded the interaction. To cause recorder number five to also archive the recorded interaction, RE 215 stores an archive action (or archive request) in archiving action queue number five. As described, interaction data 210 includes an identification of the recorder that recorded the interaction. For example, a management system (not shown) in a contact center generates and provides interaction data 210. Accordingly, RE 215 may readily determine which recorder recorded an interaction and RE 215 may store, in an action queue associated with the recorder, an archiving action request A method may include extracting, by a recorder, an archiving request from an associated action queue and archiving, by the recorder, a recording of an interaction according to the archiving request. For example, recorders 230 extract archiving requests from archiving action queues 225 and archive recorded interactions based on the extracted archiving requests.

In an embodiment, recorders 230 store (e.g., internally, on a storage device included in the recorders) recordings of interactions they recorded. Accordingly, if a recorder is caused to archive a recording of an interaction which the recorder has recorded, the recorder can quickly obtain the recording. As described, RE 215 may distribute archiving jobs or archiving requests (also referred to herein as archiving actions) such that the same recorder that recorded or logged an interaction is also caused to archive the interaction. For example, RE 215 determines which recorder recorded an interaction based on data in interactions data 210 and stores an archive request in an archiving action queue associated (as described) with the recorder.

A method may include updating, by a recorder, an archiving information queue associated with the recorder, wherein updating the archiving information queue includes indicating success or failure of the archiving of the recording of the interaction. For example, a recorder in recorders 230 updates its associated archiving information queue by storing a structure similar to the structure shown in FIG. 3 in the associated archiving information queue. For example, the recorder sets a state field in the structure to indicate "in progress" when it begins to archive the recording and changes the state field to "success" if the archiving completes successfully or "fail" if the archiving fails (e.g., due to a malfunction of storage 235 or a network connection).

Accordingly, updating an archiving information queue may include indicating success or failure of the archiving of a recording of an interaction. As described, data from the plurality of archiving information queues 240 may be collected and stored in a global table, e.g., in complete archiving table 250. In an embodiment, a global table is updated based on information collected from the plurality of archiving information queues 240 such that it includes indications of results or completion of archiving of a recordings of an interactions. For example, a global table includes an entry per archived interaction (or per interaction for which an attempt to archive its recording was made) and each entry includes at least an indication of success or failure of the archiving operation.

Using the same or similar structure to store data in archiving action queues 225, archiving information queues 240 and in a global table enable a system to perform efficiently. For example, recorders 230 may move or copy entries or structures from archiving action queues 225 to archiving information queues 240. For example, a recorder may extract an archiving action or archiving request from its associated archiving action queue, perform the requested archive operation or action (e.g., archive a recording of an interaction) and store the extracted archiving action or archiving request in its associated archiving information queue. A recorder may move or copy an archiving action or archiving request from its associated archiving action queue to its associated archiving information queue. After copying or moving an archiving action or archiving request to its archiving information queue, the recorder may modify the archiving request (now in the associated archiving information queue), e.g., to indicate successful completion of the archiving request. For example and as described, a recorder may modify data in its associated archiving information queue to indicate a progress of archiving a recording of an interaction.

Figure 2A:
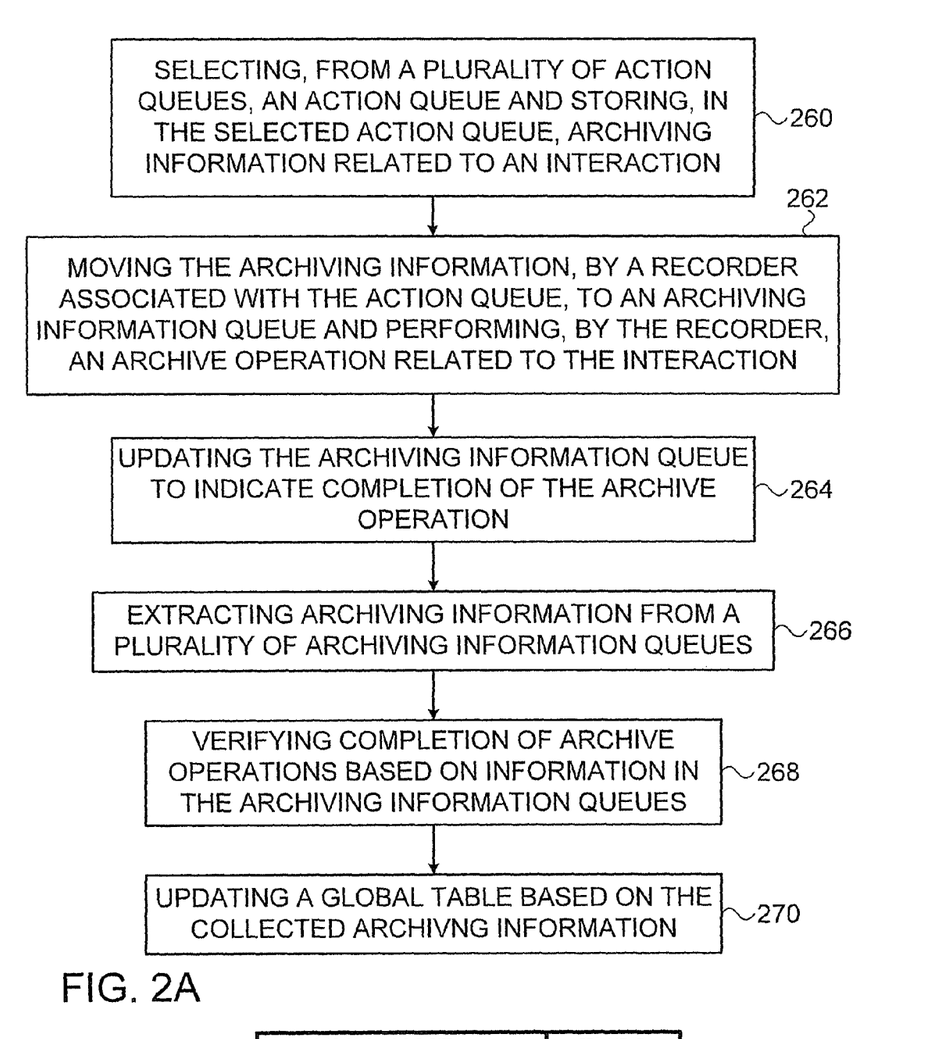
FIG. 2A shows a flow according to embodiments of the present invention.

Reference is now made to FIG. 2A which shows a flow according to some embodiments of the present invention. As shown by block 260, a method may include selecting, from a plurality of action queues, an action queue and storing, in the selected action queue, archiving information related to an interaction. For example, RE 215 selects one of archiving action queues 225 and stores archiving information related to an interaction in the selected queue. As described herein, prior to selecting a queue, RE 215 may examine information related to a recording of an interaction and may determine an identification of a recorder that recorded the interaction. Based on the identification, RE 215 may select an action queue for storing archiving information related to an interaction.

As shown by block 262, a method may include moving the archiving information, by for example a recorder associated with the action queue, to an archiving information queue and performing, by the recorder, an archive operation related to the interaction. For example, a recorder in recorders 230 may move archiving information from an archiving action queue 225 to an archiving information queue 240 and may additionally archive a recording of the interaction in storage 235.

As shown by block 264, a method may include updating the archiving information queue to indicate completion of the archive operation. A method may include updating, by the recorder, the archiving information queue to indicate a progress of the archive operation. For example, upon completion of archiving a recording of an interaction, a recorder in recorders 230 may update its associated archiving information queue to indicate completion of the archive operation.

As shown by block 266, a method may include extracting archiving information from a plurality of archiving information queues. For example, DB job 245 may extract information from the plurality of archiving information queues 240.

As shown by block 268, a method may include verifying completion of archive operations based on information in the archiving information queues. For example, DB job 245 examines information extracted from archiving information queues 240 and verifies completion of archive operations by detecting an indication of completion in the extracted information.

As shown by block 270, a method may include updating a global table based on the collected archiving information. For example, DB job 245 updates complete archiving table 250. For example, if DB job 245 determines an archiving of a recorded interaction is complete, DB job 245 may update complete archiving table 250 to reflect that the recorded interaction is archived. In an embodiment, DB job 245 updates a complete archiving table to include a reference to a recorded interaction that was successfully archived and further removes a reference from an archiving info queue. In an embodiment, before or after DB job 245 updates a complete archiving table 250 to include a reference to a recorded interaction that was successfully archived, DB job 245 removes the reference to the recorded interaction from the archiving info queue from which DB job 245 extracted the data related to the interaction. Accordingly, at any given moment, the archiving info queues 240 may mainly include references to interactions that are being archived and complete archiving table 250 main mainly include references to interactions that were successfully archived.

Figure 4:
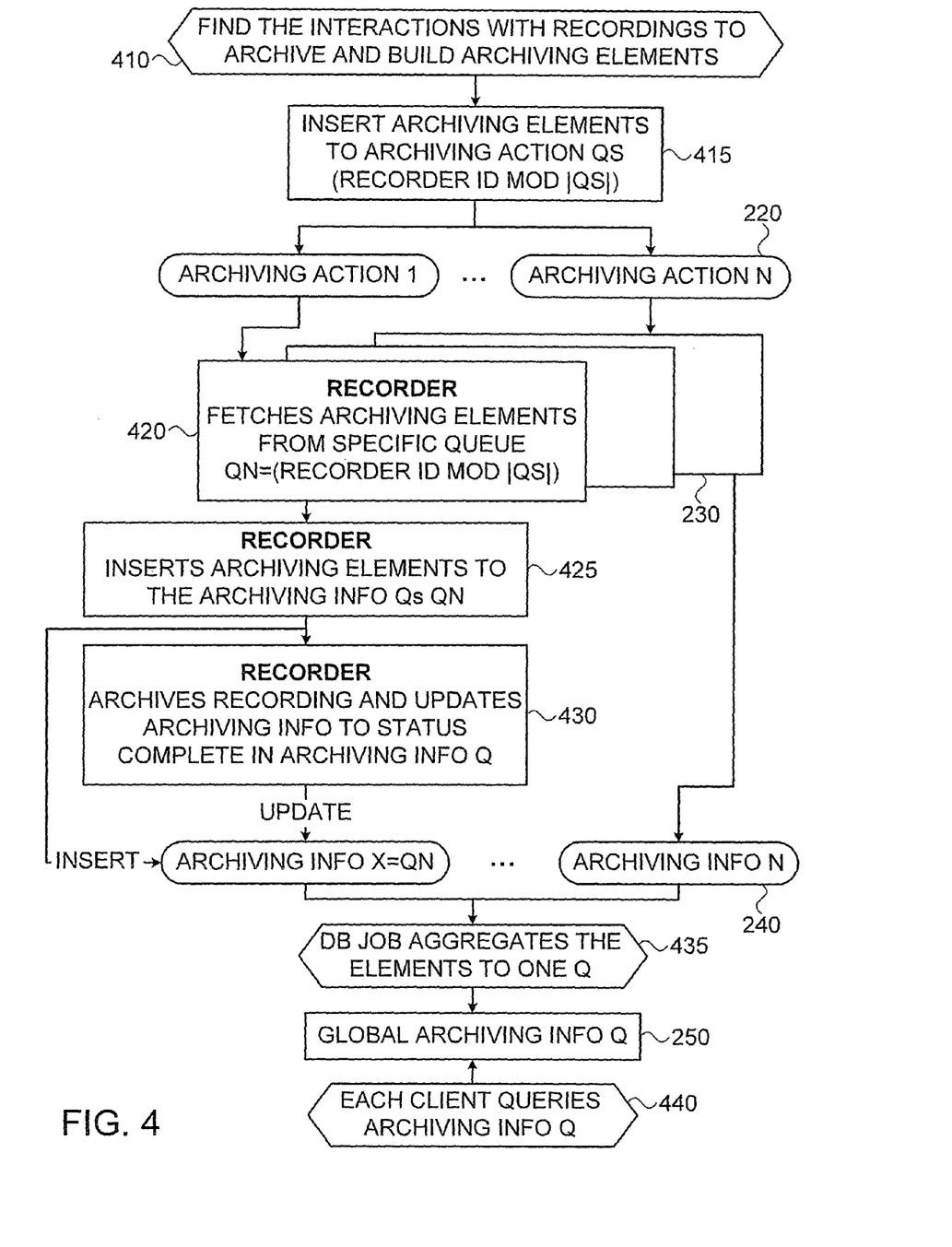
FIG. 4 shows components and a flow according to embodiments of the present invention.

Reference is now made to FIG. 4 which shows components and a flow according to some embodiments of the present invention. As shown by block 410, archiving elements may be generated based on recorded interactions that need to be archived. For example, archiving elements 410 may be objects or structures as shown by FIG. 3 and described herein.

In one embodiment, RE 215 receives or obtains interactions for archiving by receiving or obtaining archiving elements 410. For example, RE 215 receives interactions for archiving from a call controller (not shown) in a contact center. For example, a call controller sends interactions for archiving to RE 215 when an interaction ends. In another embodiment, a RE 215 fetches interactions for archiving from a database. For example, recorded interactions are stored in a database and RE 215 fetches the recorded interactions from the database.

RE 215 may be provided with one or more archiving rules and only processes interactions that match one or more archiving rules For example, a rule may indicate that audio data of calls longer than 30 seconds that further belong to a certain group of agents or customers with a retention period of 3 years are to be archived.

As shown by block 415, RE 215 may build or generate an archiving action 220 and insert the archiving action 220 into an archiving action queue (e.g., as shown by blocks 225). In one embodiment, an archiving action queue is selected based on an identification of a related recorder. For example, in one embodiment, to select an archiving action queue, RE 215 uses a modulo (also known as modulus) operation that finds the remainder of division of one number by another number.

An interaction in interactions 210 or an archiving element 410 may include an identification of the recorder that recorded the interaction (e.g., as shown by FIG. 3), for example, the identification is a number. In an embodiment, RE 215 is provided with the number of available archiving action queues 225. In one embodiment, RE 215 selects an archiving action queue for an archiving action based on an identification of a related recorder and the number of available archiving action queues using formula 1 below.

Selected Archiving actions Queue=(recorder ID)modulo(number of available action queues)    (1)

For example, if the recorder ID is seven (7) and there are five (5) available action queues then formula 1 above yields the result of two (2) thus, in this example, for an interaction recorded by recorder seven (7), RE 215 will select archiving actions queue number two (2) and place the archiving action in the selected queue. Accordingly, having selected one of archiving action queues 225, RE 215 places or stores an archiving action 220 in the selected queue.

As shown by block 420, a recorder included in recorders 230 fetches archiving elements or archiving actions 220 from archiving action queues 225. Recorders 230 may use formula 1 above to select an action queue from which to extract archiving actions 220. For example, each recorder in recorders 230 knows its own identification. Accordingly, in the above example, recorder seven (7) will extract jobs or archiving actions 220 from archiving actions queue 225 number two (2), recorder six (6) will extract archiving actions 220 from archiving actions queue 225 number one (1) and so on.

As shown by block 425, a recorder included in recorders 230 may insert an archiving element into one of archiving info queues 240. For example, an archiving element inserted by a recorder into one of archiving info queues 240 is a structure or object as shown in FIG. 3. The recorder may insert an archiving element into one of archiving info queues 240 when commencing an archive operation and set a status or state field in the archiving element to indicate the archiving is in progress (e.g., using a first predefined value). When archiving is complete, the recorder may update the archiving element to indicate the archiving is complete by modifying the state field to a second predefined value. Accordingly and as shown by block 430, a recorder selects archiving info queue (e.g., using formula 1 above) and updates the selected archiving info queue to indicate a state of an archiving operation and/or to indicate availability of an archived recording. For example, by updating a state in an archiving element to "COMPLETE" (e.g., setting a predefined value in the state field shown in FIG. 3) a recorder may indicate that a recording of an interaction is archived and available to clients. The recorder may also perform the actual archiving of the recording. For example, in addition to updating queues as described, the recorder may store a recording on storage 235.

In one embodiment of the invention, a recorder in recorders 230 moves an archiving information structure from an archiving action queue to an archiving info queue. For example, a recorder selects an action queue from one of archiving action queues 225 and extracts an archiving action from the selected queue (e.g., an archiving action stored in the queue by RE 215). For example, an archiving action extracted is a structure similar to the structure shown in FIG. 3. The recorder may move the archiving action extracted from the archiving action queue to an archiving information queue. The recorder may perform an archiving action, e.g., archive the recorded interaction. The recorder may update an archiving information (info) queue to indicate completion of the archive operation.

DB job 245 may collect archiving information from the plurality of archiving information queues 240 and verify or determines completion of related archive operations. Accordingly, in an embodiment, collecting archiving information from the plurality of archiving information queues 240 may include verifying completion of related archive operations.

As shown by block 435, DB job 245 queries archiving info queues 240 for archiving elements with a status of "COMPLETE" and inserts elements with a status of "COMPLETE" found in archiving info queues 240 to complete archiving table 250 where the elements can be queried by applications or clients of a system as shown by block 440.

Figure 5:
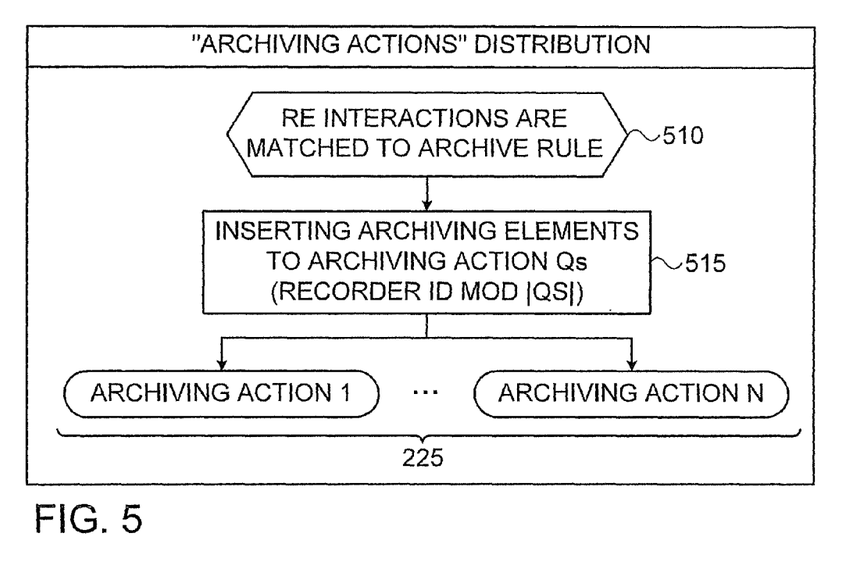
FIG. 5 shows components and a flow according to embodiments of the present invention.

Reference is now made to FIG. 5 which shows components and a flow according to some embodiments of the present invention. FIG. 5 shows distribution of archiving actions. In an embodiment, RE 215 receives interactions 210, processes the interactions, generates archiving actions 220 and distributes archiving actions 220 over archiving actions queues 225. For example, a distribution of archiving actions 220 over archiving actions queues 225 may be according to formula 1 above. As shown by block 510, interactions may be matched with a rule. As shown by block 515, an element may be inserted to a queue which is selected based on an identification of the recorder that performed the recording of the relevant interaction. For example, an element inserted into one of archiving queues 225 is a table or list as shown in FIG. 3.

Processing interactions by RE 215 may include examining information related to an interaction. For example, in an embodiment, interactions data 210 includes any relevant metadata related to an interaction, e.g., name of the agent who participated in the interaction, identification of a customer, identification of the recorder or logger that recorded the interaction, a time and duration and the like. RE 215 may examine data in interactions data 210, possibly apply a rule as described herein and may then generate an archiving action 220 based on an examination of interactions data 210. For example, an archive action may be a structure as shown in FIG. 3 that includes a command to archive a recording of the interaction.

Figure 6:
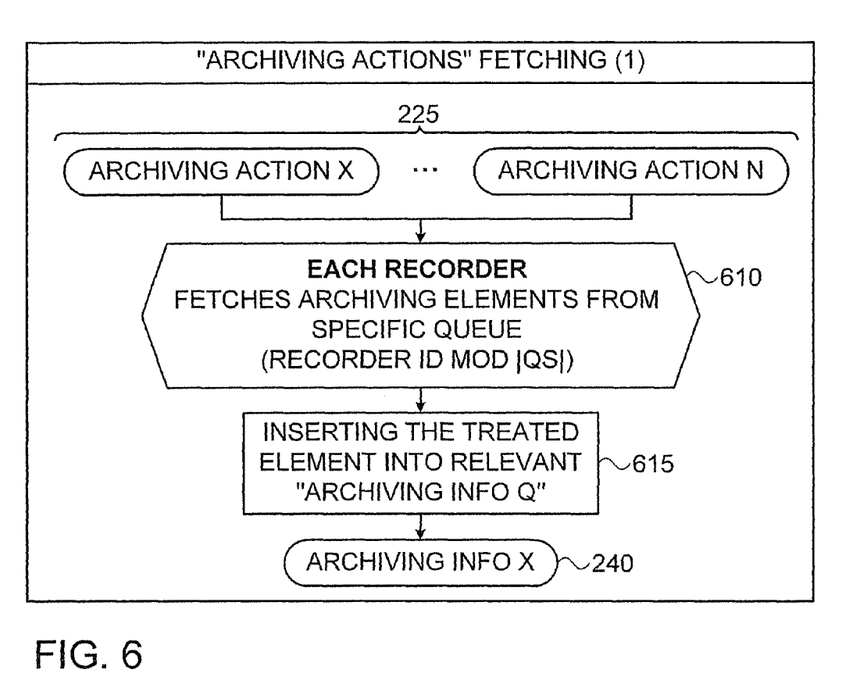
FIG. 6 shows components and a flow according to embodiments of the present invention.

Reference is now made to FIG. 6 which shows components and a flow according to some embodiments of the present invention. FIG. 6 shows fetching of archiving actions 220 from archiving action queues 225. For example and as shown by block 610, in each of recorders 230, archiving manager 231 uses formula 1 above to select one of archiving actions queues 225. In an embodiment, in each of recorders 230, archiving manager 231 is provided with the recorder's identification and uses this identification in formula 1.

In one embodiment, after selecting the queue, archiving manager 231 searches the queue for jobs for its recorder. For example, if three (3) archiving action queues are available, an archiving manager 231 included in a recorder with a recorder identification of five (5) will select archiving actions queue two (2) using formula 1 and then search for archiving actions for recorder five (5) in archiving actions queue two (2). For example, an interface unit in archiving actions queues 225 enables searching for archiving actions for a specific recorder, e.g., based on the "iLoggerID" value as shown in FIG. 3.

As shown by block 615, archiving manager 231 may insert an element into one of archiving info queues 240. In an embodiment, selection of an archiving info queue from archiving info queues 240 is according to a formula similar to formula 1 wherein the as shown by formula 2 below:

$$\text{Archiving info Queue} = (\text{recorder ID}) \bmod \text{ulo}(\text{number of available info queues}) \quad (2)$$

For example, an element inserted into an archiving info queue 240 is as shown in FIG. 3. In an embodiment, archiving manager 231 initially sets the "iArchiveState" to "PENDING". In the embodiment, when a recorder 230 successfully completes archiving a recording of the interaction, archiving manager 231 sets the "iArchiveState" to "COMPLETE". In the embodiment, if the recorder failed to archive the interaction, archiving manager 231 sets the "iArchiveState" to "ERROR". It will be understood that other events may cause other values to be stored in "iArchiveState".

In one embodiment, the actual archiving process is performed by a recorder 230 as known in the art. Generally, a recorder 230 archives interactions (e.g., in storage 235 that may be any database or other suitable storage system or unit) and recorder 230 stores metadata in a memory accessible to at least its archiving manager 231. For example, upon completion of archiving an interaction by storing a recording of the interaction in storage 235, a recorder 230 updates a memory variable and/or otherwise notifies its archiving manager 231.

Figure 7:
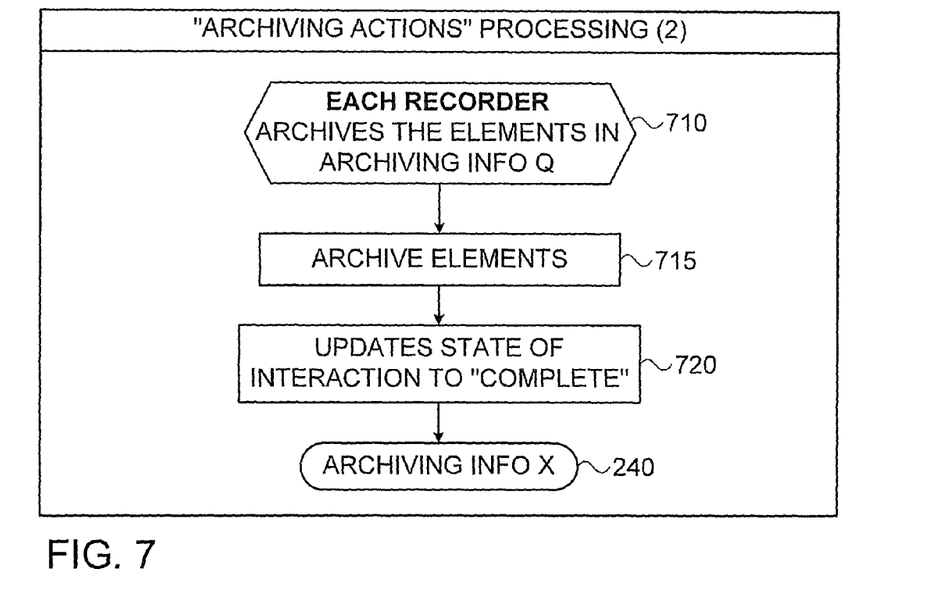
FIG. 7 shows components and a flow according to embodiments of the present invention.

Reference is now made to FIG. 7 which shows components and a flow according to some embodiments of the present invention. FIG. 7 shows fetching of archiving actions 220 from archiving action queues 225. As shown by block 710, each recorder 230 selects archiving actions as describes and as shown by block 715, the recorder archives the interaction as indicated in the archiving action. As shown by block 720, upon completion or termination of an archiving operation, a state related to the interaction is updated. For example, archiving manager 231 updates a state of the interaction in the relevant archiving info queue 240 by setting the state to pending while the recorder is archiving the interaction, updates the state to "COMPLETE" if the archiving operation completed successfully, or sets or updates the state to "ERROR" if the archiving operation failed. It will be noted the update performed by archiving manager 231 may be a bulk operation that only includes replacing a state but does not include moving or copying of objects, e.g., moving or copying of objects from a first to a second queue.

Figure 8:
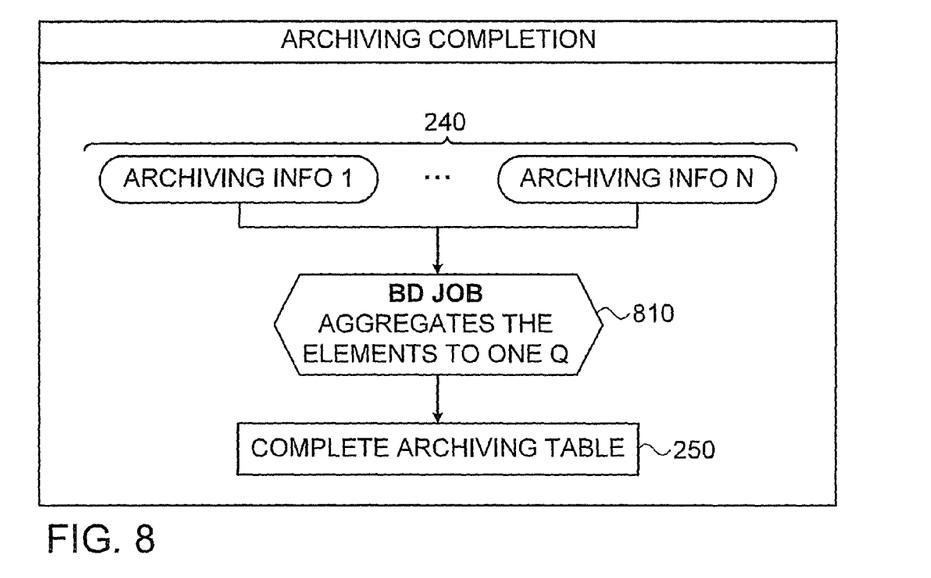
FIG. 8 shows components and a flow according to embodiments of the present invention.

Reference is now made to FIG. 8 which shows components and a flow according to some embodiments of the present invention. FIG. 8 shows operations that may be performed upon completion of an archiving operation, e.g., upon completion of storing a recording and other metadata in storage 235. In an embodiment and shown by block 810, DB job 245 aggregates elements from archiving info queues 240 into complete archiving table 250 that may be any suitable queue, table or list usable by clients of a system in order to use stored interactions. In an embodiment, DB job 245 periodically or continuously searches archiving info queues 240 for completed interactions by examining the state field as described herein. For example, archiving info queues 240 may include an interface unit that, per request or query, search the queue for entries or elements in which the "iArchivingState" is set to "COMPLETE" and provides entries or elements found. DB job 245 may delete or remove elements from archiving info queues 240 if they are entered into complete archiving table 250. Clients may use complete archiving table 250, e.g., in order to generate reports, queries etc.

Figure 9:
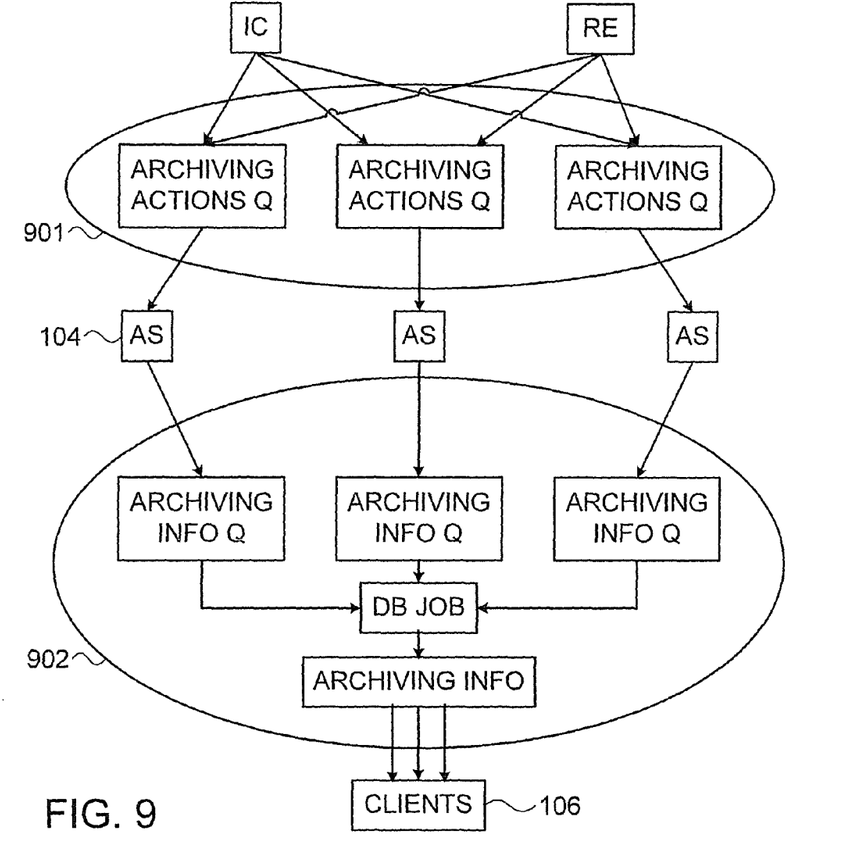
FIG. 9 shows components and a flow according to embodiments of the present invention.

Reference is now made to FIG. 9 which shows components and a flow according to some embodiments of the present invention. FIG. 9 graphically shows how the problem described with reference to FIG. 1 may be solved by an embodiment of the invention. As shown by circle 901, the bottleneck shown by circle 120 in FIG. 1 no longer exists in one system according to an embodiment of the invention. Other or different benefits may exist. As shown by circle 902, the bottleneck shown by circle 130 in FIG. 1 no longer exists in a system according to embodiments of the invention.

In particular and as shown, rather than having multiple readers and multiple writers all compete for the same resource (e.g., same table or queue) one embodiment enables having multiple writers to a resource and a single reader from the resource or and a single writer to a resource and multiple readers from the resource thus avoiding the undesirable and problematic flow or scheme of multiple readers and multiple writers of the same resource.

Figure 10:
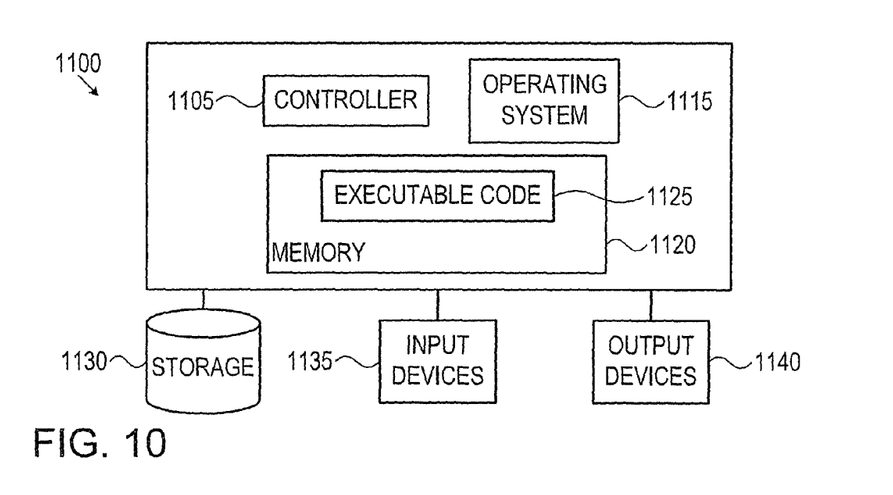
FIG. 10 shows high level block diagram of an exemplary computing device according to embodiments of the present invention.

Reference is made to FIG. 10, showing high level block diagram of an exemplary computing device according to embodiments of the present invention. Computing device 1100 may include a processor or controller 1105 that may be, for example, a central processing unit processor (CPU), a chip or any suitable computing or computational device, an operating system 1115, a memory 1120, a storage 1130, one or more input devices 1135 and one or more output devices 1140.

Operating system 1115 may be or may include any code segment designed and/or configured to perform tasks involving coordination, scheduling, arbitration, supervising, controlling or otherwise managing operation of computing device 1100, for example, scheduling execution of programs. Operating system 1115 may be a commercial operating system. Memory 1120 may be a non-transitory memory and may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1120 may be or may include a plurality of, possibly different memory units. Memory 1120 may store structures and entities described herein. For example, archiving action queues, archiving info queues and complete archiving table may be stored in memory 1120 and manipulated by controller 1105. For example, rule engine 215 and DB job 245 may be included (or implemented) in executable code 1125 and may interact with archiving action queues, archiving info queues and complete archiving table stored in memory 1120.

Executable code 1125 may be any executable code, e.g., an application, a program, a process, task or script. Executable code 1125 may be executed by controller 1105 under control of operating system 1115. For example, executable code 1125 may be an application that performs tasks and operations performed by RE 215 or by DB job 245 or by archiving manager 231 or recorders 230. Accordingly, units or modules such RE 215, DB job 245, archiving manager 231 or recorders 230 may be implemented using device 1100 or using hardware devices that include components included in device 1100. For example, each of RE 215, DB job 245, archiving manager 231 and recorders 230 may be a device that includes a controller or processor 1105, a memory 1120 and executable code 1125. In other embodiments, a single device 1100 may include some of RE 215, DB job 245, archiving manager 231 and recorders 230.

Where applicable, executable code 1125 may carry out operations described herein in real-time. Computing device 1100 and executable code 1125 may be configured to update, process and/or act upon information at the same rate the information, or a relevant event, are received. In some embodiments, more than one computing device 1100 may be used. For example, a plurality of computing devices that include components similar to those included in computing device 1100 may be connected to a network and used as a system. For example, a number of computing devices 1100 may be used to implement RE 215, DB job 245, archiving manager 231 and recorders 230. Thus RE 215, DB job 245, archiving manager 231 and recorders 230 may in some embodiments be computing device 1100 or controller 1105. Computing device 1100 and controller or processor 1105 may be configured to carry out methods according to embodiments of the invention by, for example, executing executable code 1125.

Storage 1130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 1130 and may be loaded from storage 1130 into memory 1120 where it may be processed by controller 1105. In some embodiments, some of the components shown in FIG. 10 may be omitted. For example, memory 1120 may be a non-transitory or non-volatile memory having the storage capacity of storage 1130. Accordingly, although shown as a separate component, storage 1130 may be embedded or included in memory 1120.

Input devices 1135 may be or may include a mouse, a keyboard, a touch screen or pad or any suitable input device. It will be recognized that any suitable number of input devices may be operatively connected to computing device 1100 as shown by block 1135. Output devices 1140 may include one or more displays, speakers and/or any other suitable output devices. It will be recognized that any suitable number of output devices may be operatively connected to computing device 1100 as shown by block 1140. Any applicable input/output (I/O) devices may be connected to computing device 1100 as shown by blocks 1135 and 1140. For example, a wired or wireless network interface card (NIC), a modem, a printer, a universal serial bus (USB) device or external hard drive may be included in input devices 1135 and/or output devices 1140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1120, computer-executable instructions such as executable code 1125 and a controller such as controller 1105.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A system comprising:
    a memory storing two sets of queues, a first set including a plurality of archiving action queues and a second set including a plurality of archiving information queues;
    a rule engine configured to:
        examine information related to an interaction,
        select, from the first set, an archiving action queue, and
        store, in the selected archiving action queue, archiving information related to the interaction, wherein the archiving information is usable for archiving the interaction;
    a plurality of recorders, each configured to:
        select, from the first set of queues, an archiving action queue,
        extract archiving information from the selected archiving action queue,
        perform an archiving operation based on the extracted archiving information,
        select, from the second set of queues, an archiving information queue, and
        store, in the selected archiving information queue, information including a result of the archiving operation; and
    a unit configured to:
        examine archiving information in the second set of queues,
        identify archiving operations that were completed successfully, and
        update a global table to include successfully completed archiving operations.

2. The system of claim 1 wherein updating the global table comprises including, in the global table, a reference to a recording of the interaction.

3. The system of claim 1 wherein each recorder included in the plurality of recorders is configured to select an action queue based on an identification parameter associated with the recorder.

4. The system of claim 1 wherein the rule engine is configured to select an action queue for an interaction based on an identification of a recorder that recorded the interaction.

5. The system of claim 1 wherein the recorders are configured to update the archiving information queues to indicate successful completion of an archiving operation.

6. A method comprising:
    selecting, from a first set of queues that includes a plurality of archiving action queues, an action queue and storing, in the selected action queue, archiving information related to an interaction;
    moving the archiving information, by a recorder associated with the action queue, to an archiving information queue and performing, by the recorder, an archive operation related to the interaction, wherein the archiving information queue is included in a second set of queues;
    updating the archiving information queue to indicate completion of the archive operation;
    examining archiving information in a plurality of archiving information queues included in the second set of queues;
    identifying archiving operations that were completed successfully; and updating a global table based on the collected archiving information such that the global table include successfully completed archiving operations.

7. The method of claim 6, wherein collecting archiving information from the plurality of archiving information queues comprises verifying completion of related archive operations.

8. The method of claim 6, wherein updating the global table comprises including, in the global table, a reference to a recording of the interaction.

9. The method of claim 6, wherein selecting an action queues is based on an identification of a recorder that recorded the interaction.

10. A method comprising:
   examining information related to a recording of an interaction and determining an identification of a recorder that recorded the interaction;
   selecting, from a first set of queues and based on the identification, an archiving action queue for storing archiving information related to an interaction;
   moving the archiving information, by the recorder, to an archiving information queue and performing, by the recorder, an archive operation related to the interaction, wherein the archiving information queue is included in a second set of queues;
   updating, by the recorder, the archiving information queue to indicate a progress of the archive operation;
   identifying archiving operations that were completed successfully by examining information in a plurality of archiving information queues included in a second set of queues; and
   updating a global table based on archiving information obtained from the plurality of archiving information queues such that the global table include successfully completed archiving operations.

11. The method of claim 10, wherein updating the global table comprises verifying completion of archive operations based on archiving information.

12. The method of claim 10, wherein updating the global table comprises including, in the global table, a reference to a recording of the interaction.

13. A method comprising:
   associating a first set of queues including a plurality of archiving action queues and a second set of queues including a plurality of archiving information queues with a respective plurality of recorders;
   determining the recorder of the plurality of recorders that recorded an interaction and storing, in an archiving action queue associated with the recorder and selected from the first set of queues, an archiving action request;
   extracting, by the recorder, the archiving request from the archiving action queue and archiving, by the recorder, a recording of the interaction;
   updating, by the recorder, an archiving information queue associated with the recorder, wherein the archiving information queue is selected from the second set of queues and wherein updating the archiving information queue includes indicating success or failure of the archiving of the recording of the interaction;
   identifying archiving operations that were completed successfully by examining information in a plurality of archiving information queues included in a second set of queues; and
   updating a global table based on archiving information obtained from the plurality of archiving information queues such that the global table include successfully completed archiving operations.

14. The method of claim 13, wherein updating a global table includes indicating, in the global table, a result of the archiving of the recording of the interaction.

15. The method of claim 13, wherein updating the global table comprises including, in the global table, a reference to a recording of the interaction.

16. The method of claim 13, comprising moving the archiving action request, by the recorder, to an associated archiving information queue.

17. The method of claim 13, comprising accessing a recording of an interaction by obtaining a reference to the recording from global table.

18. The method of claim 13, wherein updating an archiving information queue comprises including in the archiving information queue an indication of a progress of archiving a recording of an interaction.

* * * * *